United States Patent
Hsu

(10) Patent No.: US 6,343,635 B1
(45) Date of Patent: Feb. 5, 2002

(54) VEHICLE TIRE WITH AIR CIRCULATION ARRANGEMENT

(76) Inventor: Shut-Chen Hsu, No. 7, Alley 1, Lane 163, Sec. 3, Nung-Chuan Rd., I Lan (TW)

( * ) Notice: Subject to any disclaimer, the term of this patent is extended or adjusted under 35 U.S.C. 154(b) by 0 days.

(21) Appl. No.: 09/459,595

(22) Filed: Dec. 13, 1999

(30) Foreign Application Priority Data

Oct. 22, 1999 (TW) .......................................... 88118349 A

(51) Int. Cl.$^7$ ................................................. B60L 5/04
(52) U.S. Cl. ...................... 152/153; 152/203; 152/511; 152/544
(58) Field of Search ................................ 152/153, 157, 152/166, 203, 204, 201, 511, 512, 544, 521, DIG. 9

(56) References Cited

U.S. PATENT DOCUMENTS

| | | | | |
|---|---|---|---|---|
| 788,309 A | * | 4/1905 | Ferguson ..................... | 152/203 |
| 1,440,553 A | * | 1/1923 | Privet ........................... | 152/511 |
| 1,474,387 A | * | 11/1923 | Schoneberger ............... | 152/204 |
| 1,791,214 A | * | 2/1931 | Kline ........................... | 152/511 |
| 2,026,161 A | * | 12/1935 | Collins ........................ | 152/153 |
| 2,033,882 A | * | 3/1936 | Darrow ........................ | 152/153 |
| 2,041,534 A | * | 5/1936 | Eger ........................... | 152/153 |
| 2,619,147 A | * | 11/1952 | Hoffman ...................... | 152/153 |
| 6,105,642 A | * | 8/2000 | Carson et al. ............... | 152/203 |

* cited by examiner

Primary Examiner—Geoffrey L. Knable
(74) Attorney, Agent, or Firm—Rosenberg, Klein & Lee

(57) ABSTRACT

A vehicle tire, which includes an outer tire fastened to a rim, a plurality of hooks, which secure the outer tire to the rim, an inner tube mounted within the outer tire and the rim, the inner tube having a plurality of pegs raised from a sidewall thereof at an inner side and defining a plurality of air channels, and a protective cushion mounted within the outer tire around the inner tube to protect the inner tube against external objects, the protective cushion having a plurality of pegs raised from the periphery thereof and defining a plurality of air channels, the hooks each having a plurality of longitudinally extended flow guide grooves for guiding outside air to circulate through the air channels in the protective cushion and the inner tube to carry heat away from the inside of the tire.

1 Claim, 9 Drawing Sheets

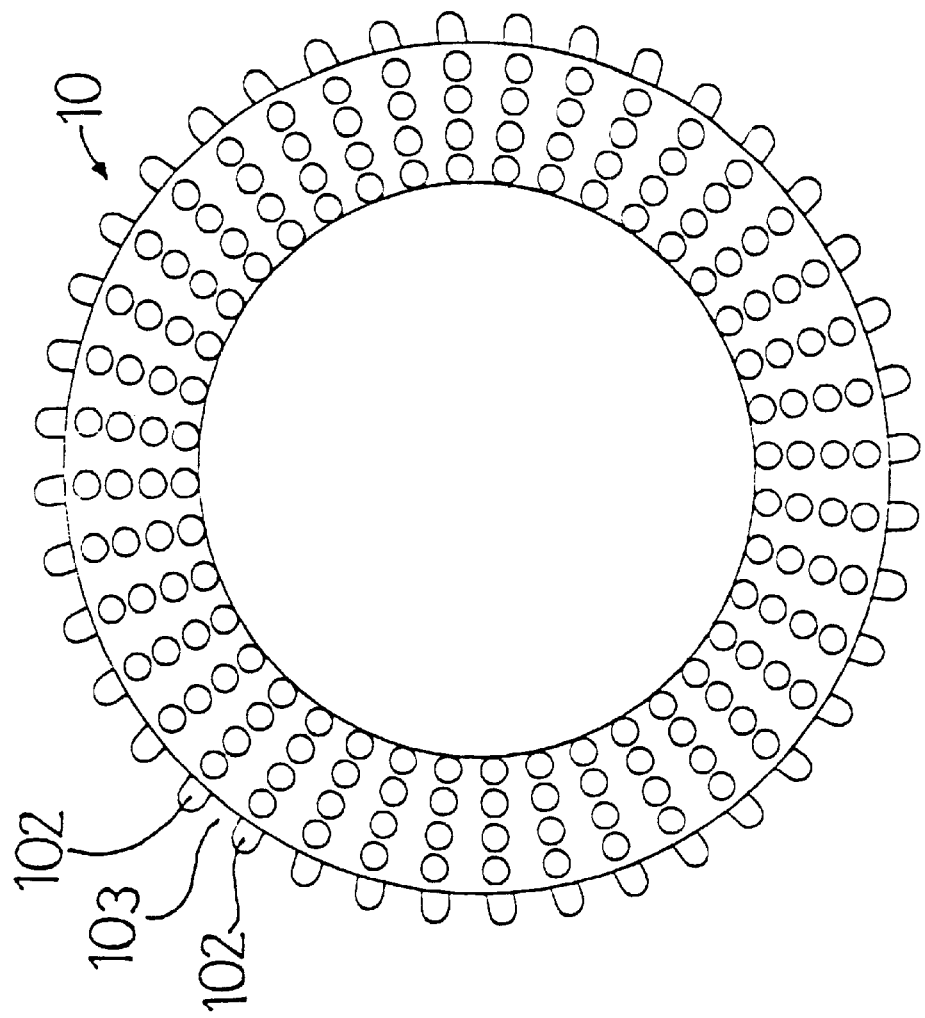
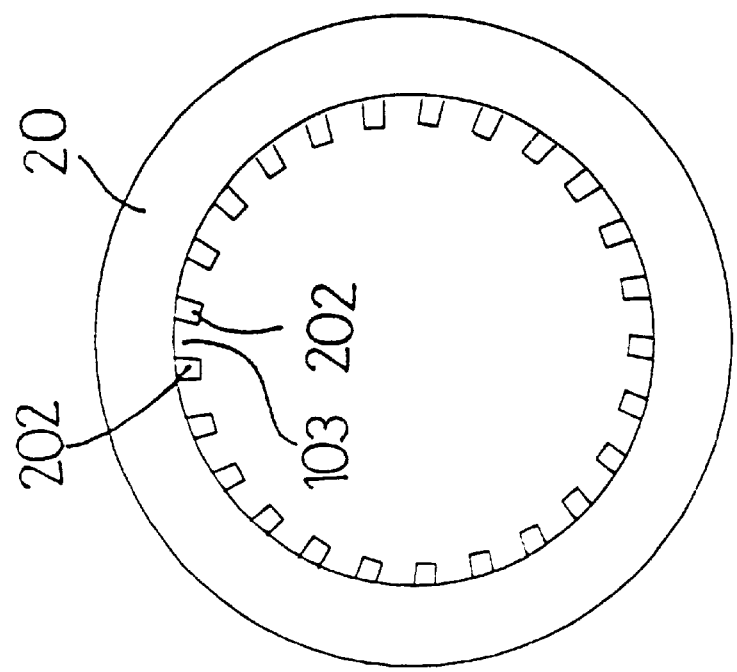
FIG. 5

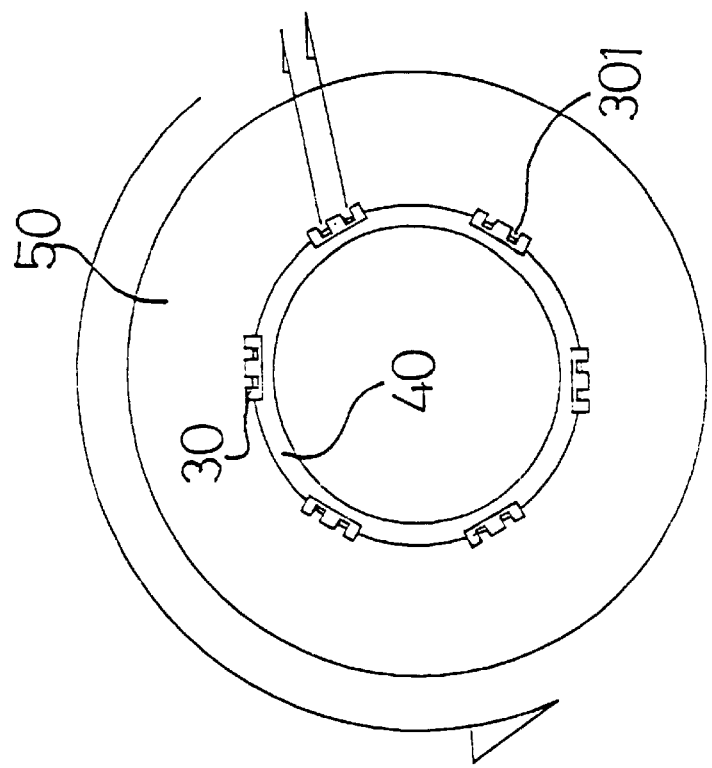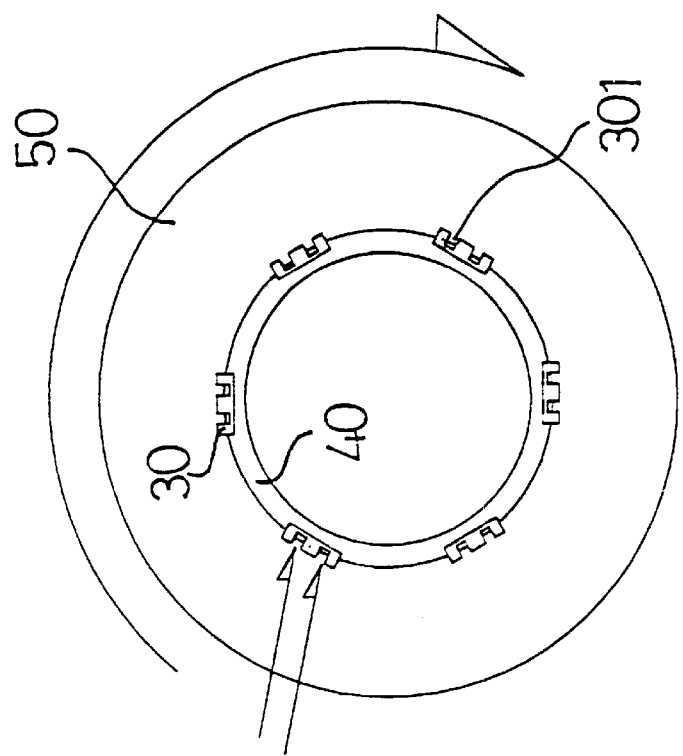
FIG.9

VEHICLE TIRE WITH AIR CIRCULATION ARRANGEMENT

BACKGROUND OF THE INVENTION

The present invention relates to a vehicle tire, and more particularly to such a vehicle tire, which has means to guide circulation of air, for enabling heat to be quickly carried away from the inside of the tire.

Many people use a motorcar as their personal daily transportation vehicle. For a safety driving, the condition of the tires must be regularly checked. When driving the motorcar on the road, the tire may explore if pierced by an external object. Further, a tire may explore easily when hot. Because regular tires have no means to dissipate heat, the tires wear quickly with use when running on the road under a high temperature.

SUMMARY OF THE INVENTION

The present invention has been accomplished under the circumstances in view. According to one aspect of the present invention, a protective cushion is mounted within the outer tire around the inner tube to protect the inner tube against external objects. According to another aspect of the present invention, the inner tube and the protective cushion are made with pegs, defining multiple air channels for circulation of air, and the hooks which secure the outer tire to the rim have flow guide grooves for guiding air in and out of the air channels for enabling heat to be quickly carried away from the vehicle tire.

BRIEF DESCRIPTION OF THE DRAWINGS

FIG. 5 are side views of the protective cushion and the inner tube according to the present invention.

FIG. 9 is a schematic drawing showing the circulation of air through the vehicle tire when rotated in different directions.

DETAILED DESCRIPTION OF THE PREFERRED EMBODIMENT

Referring to the annexed drawings in detail, the present invention comprises a protective cushion 10, an inner tube 20, and a plurality of flow guide hooks 30.

Figure 1:
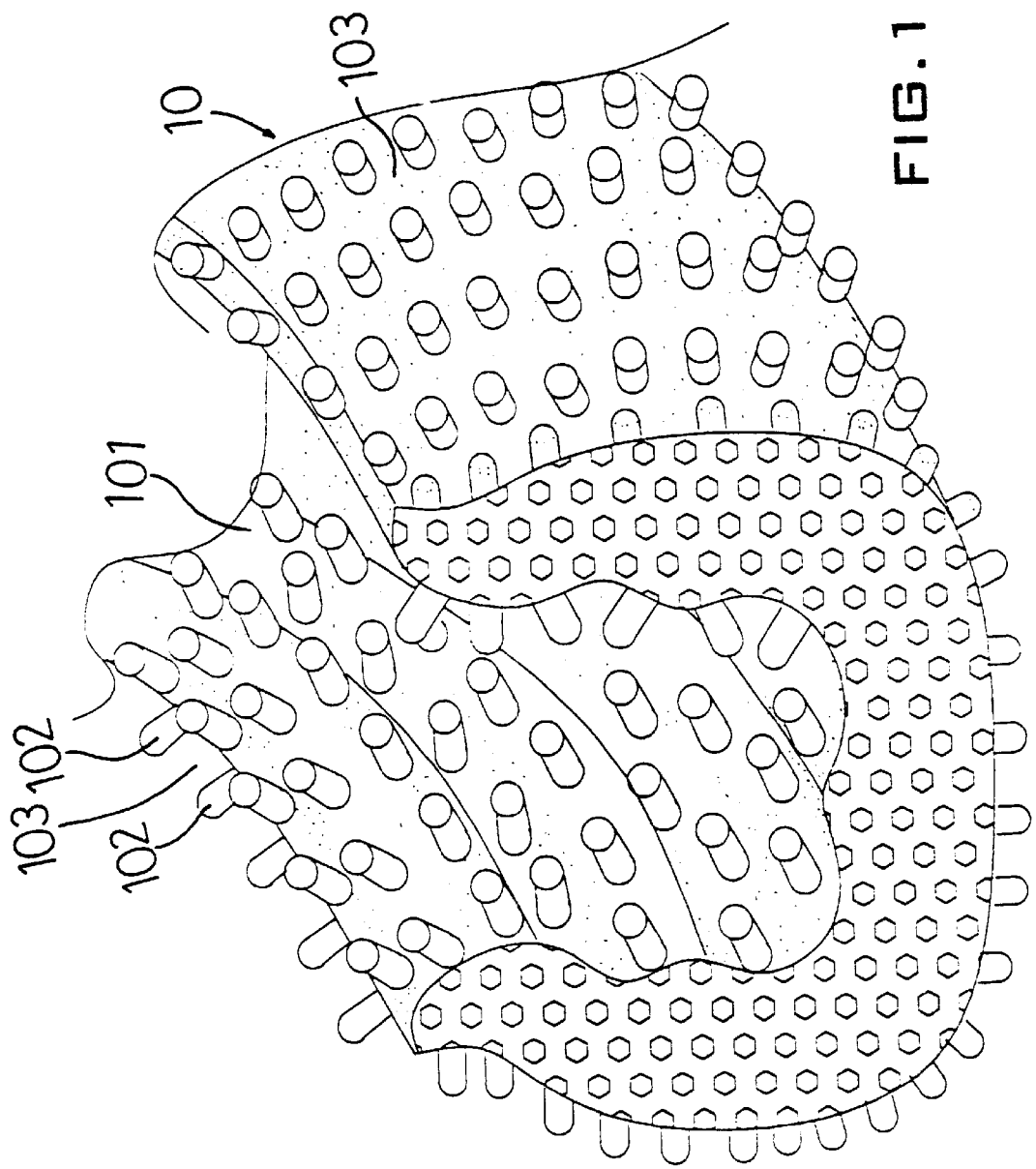
FIG. 1 is a cutaway of a protective cushion according to the present invention.

The protective cushion 10 (see FIGS. 1 and 5) is formed of a big number of air cells, comprising an annular groove 101 disposed on the inside, and a plurality of pegs 102 raised from the periphery thereof, which define multiple air circulation channels 103.

Figure 2:
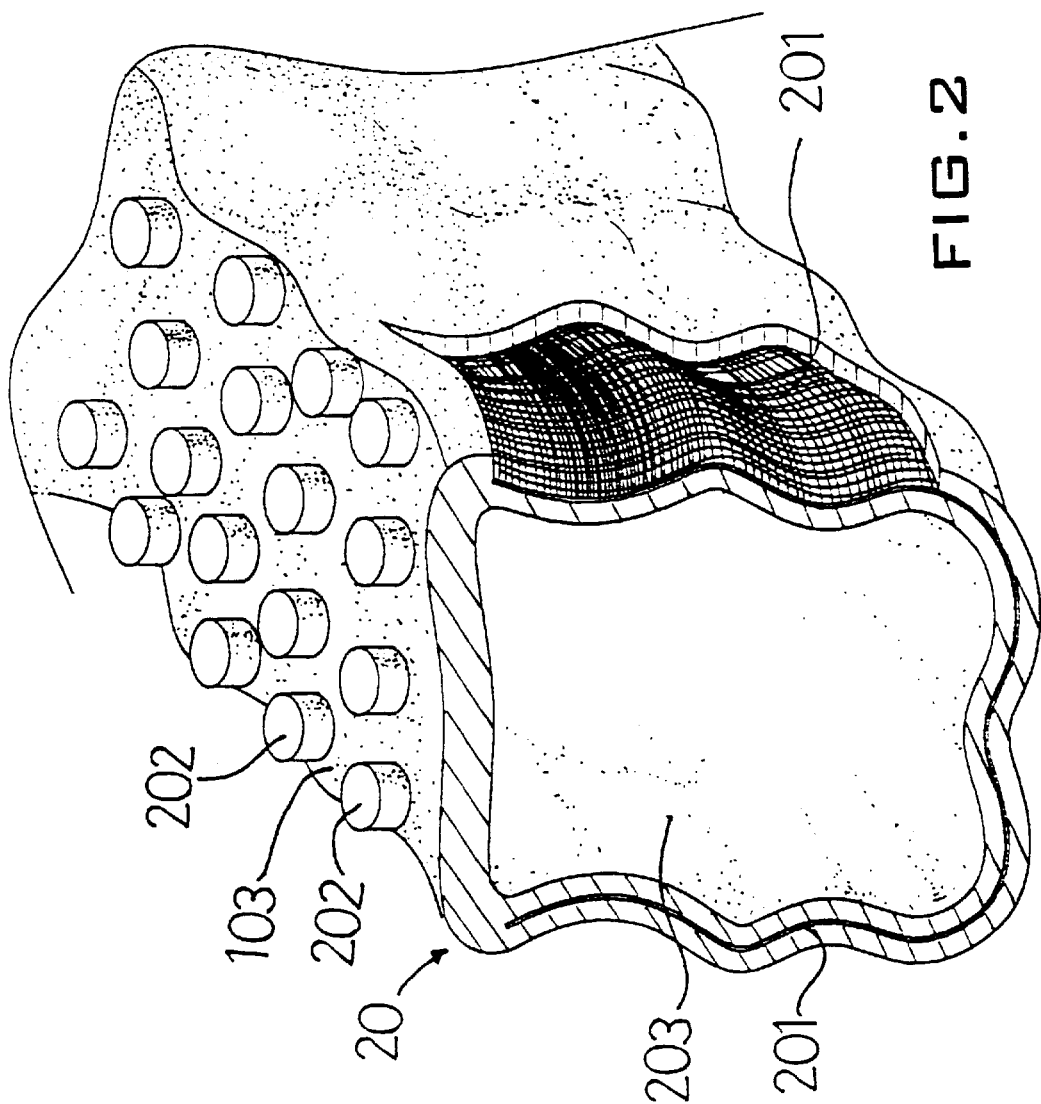
FIG. 2 is a cutaway of an inner tube according to the present invention.

The inner tube 20 (see FIGS. 2 and 5) comprises a layer of protective mesh 201 made of resilient, high density, high strength material embedded on the inside, and a plurality of pegs 202 raised from the sidewall thereof and defining a multiple air circulation channels 103.

Figure 3:
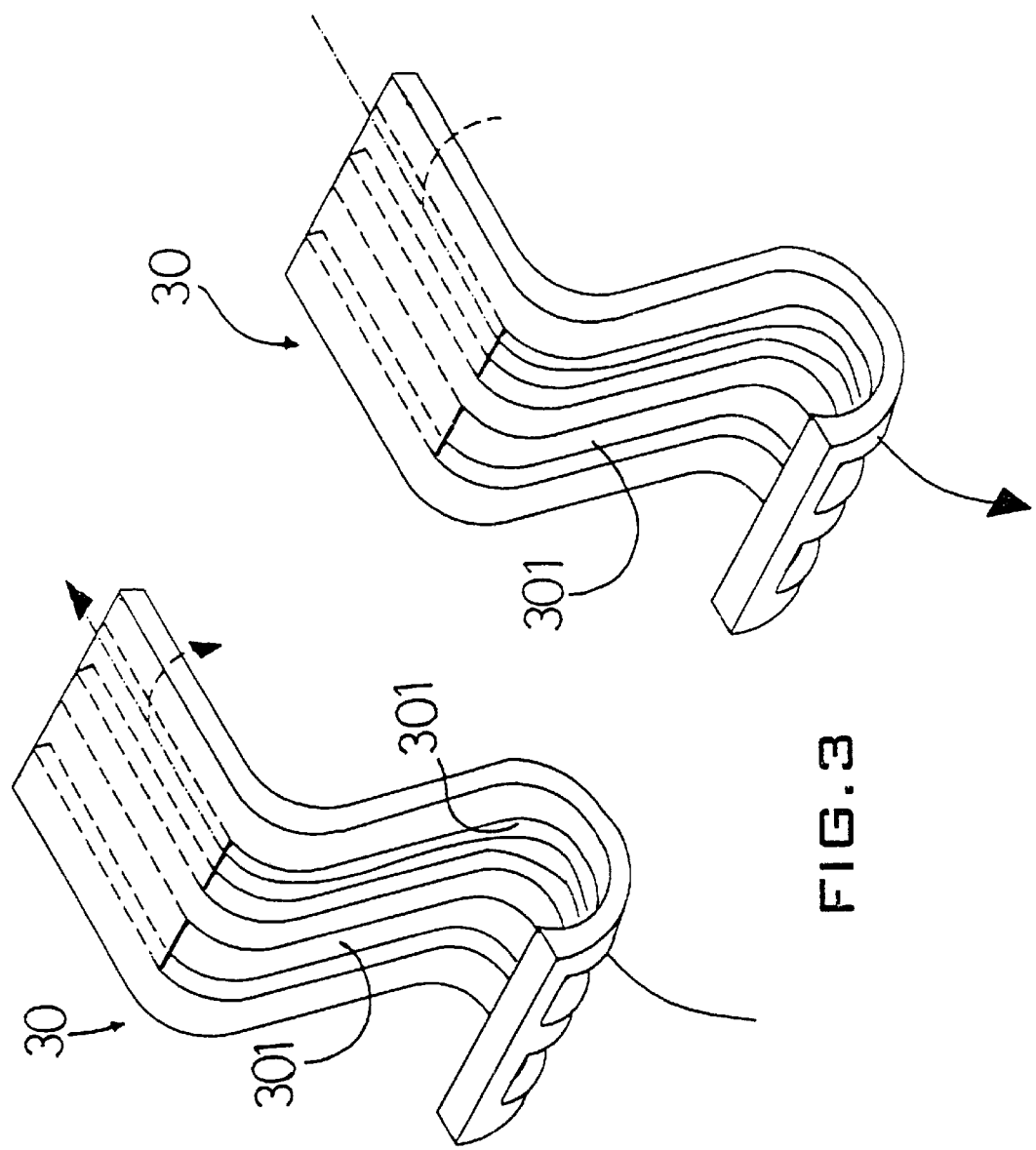
FIG. 3 illustrates the structure of flow guide hooks according to the present invention.
Figure 4:
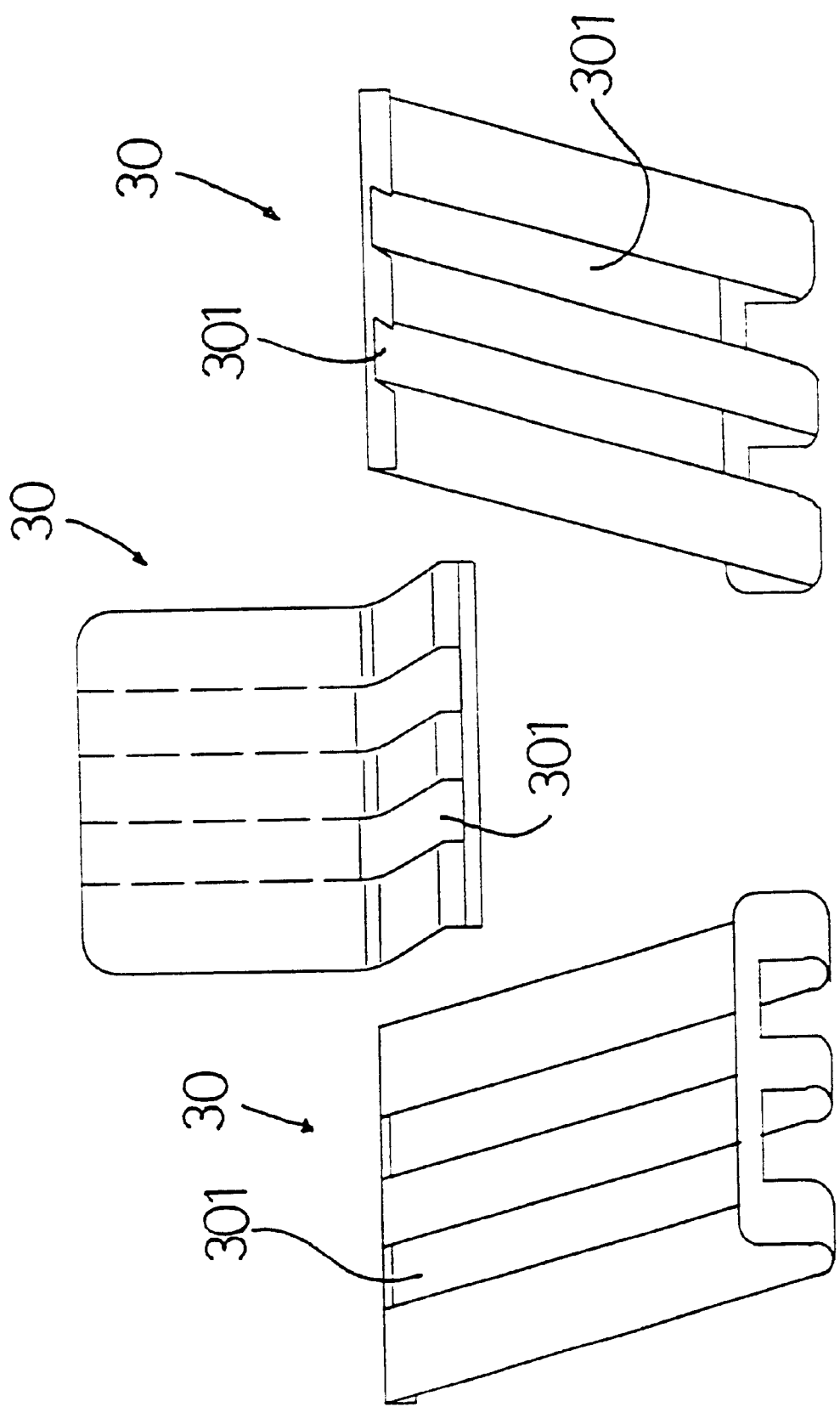
FIG. 4 shows flow guide hooks viewed from different angles.

The flow guide hooks 30 (see FIGS. 3 and 4) each comprise a plurality of longitudinally extended flow guide grooves 301. The flow guide grooves 301 each have two opposite sloping sidewalls.

Figure 6:
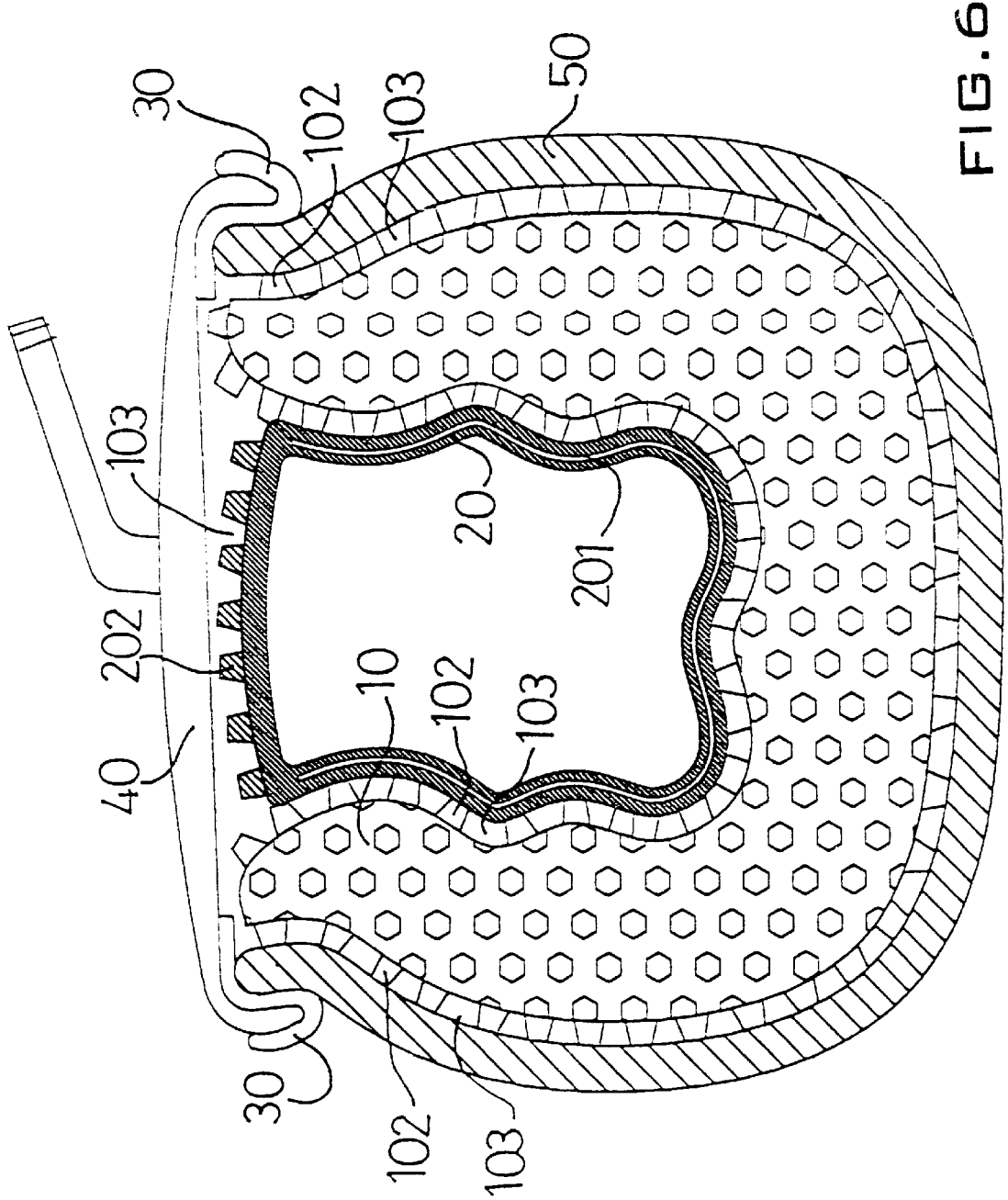
FIG. 6 is a sectional assembly view of the present invention.
Figure 7:
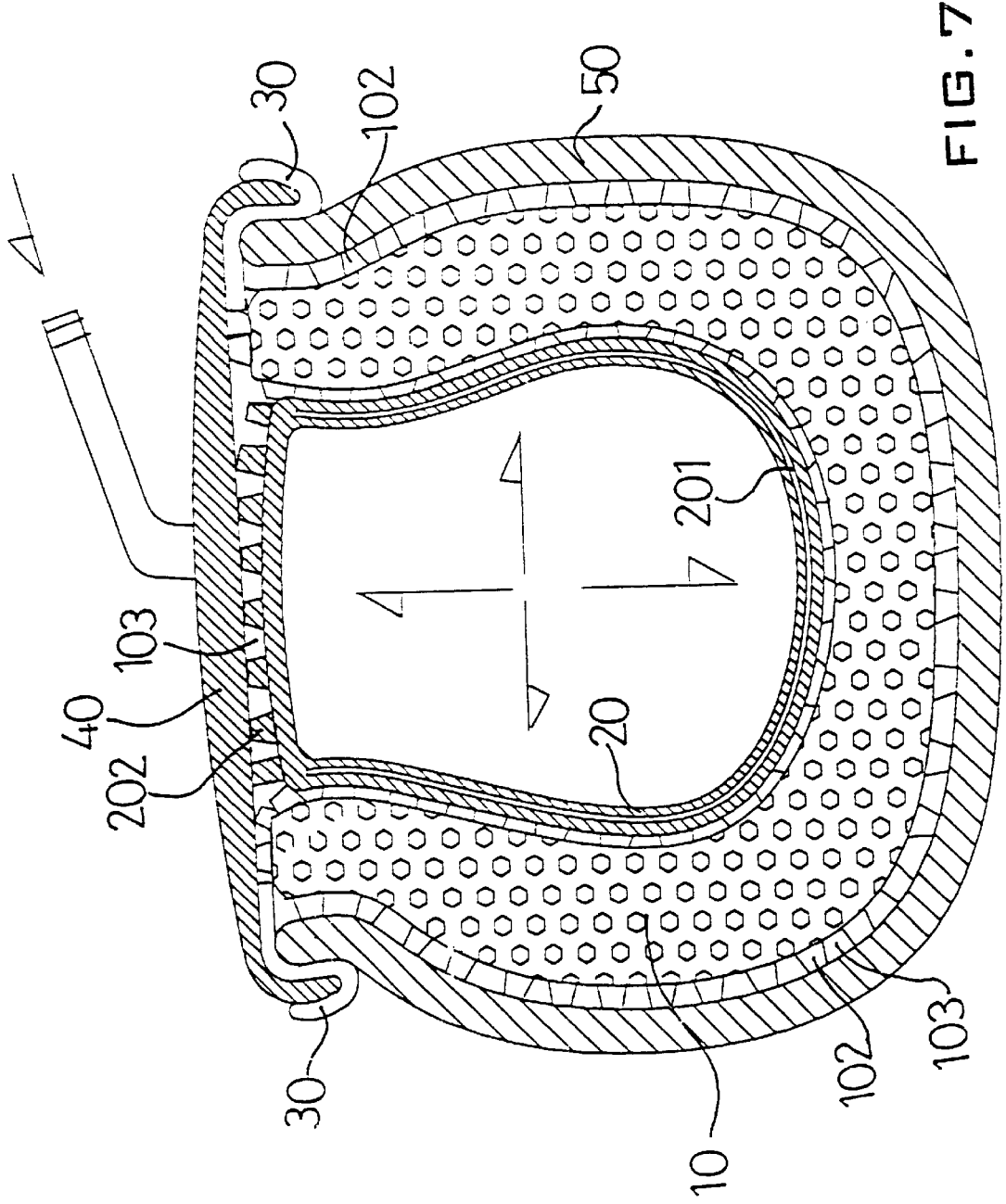
FIG. 7 is similar to FIG. 6 but showing the inner tube inflated.
Figure 8:
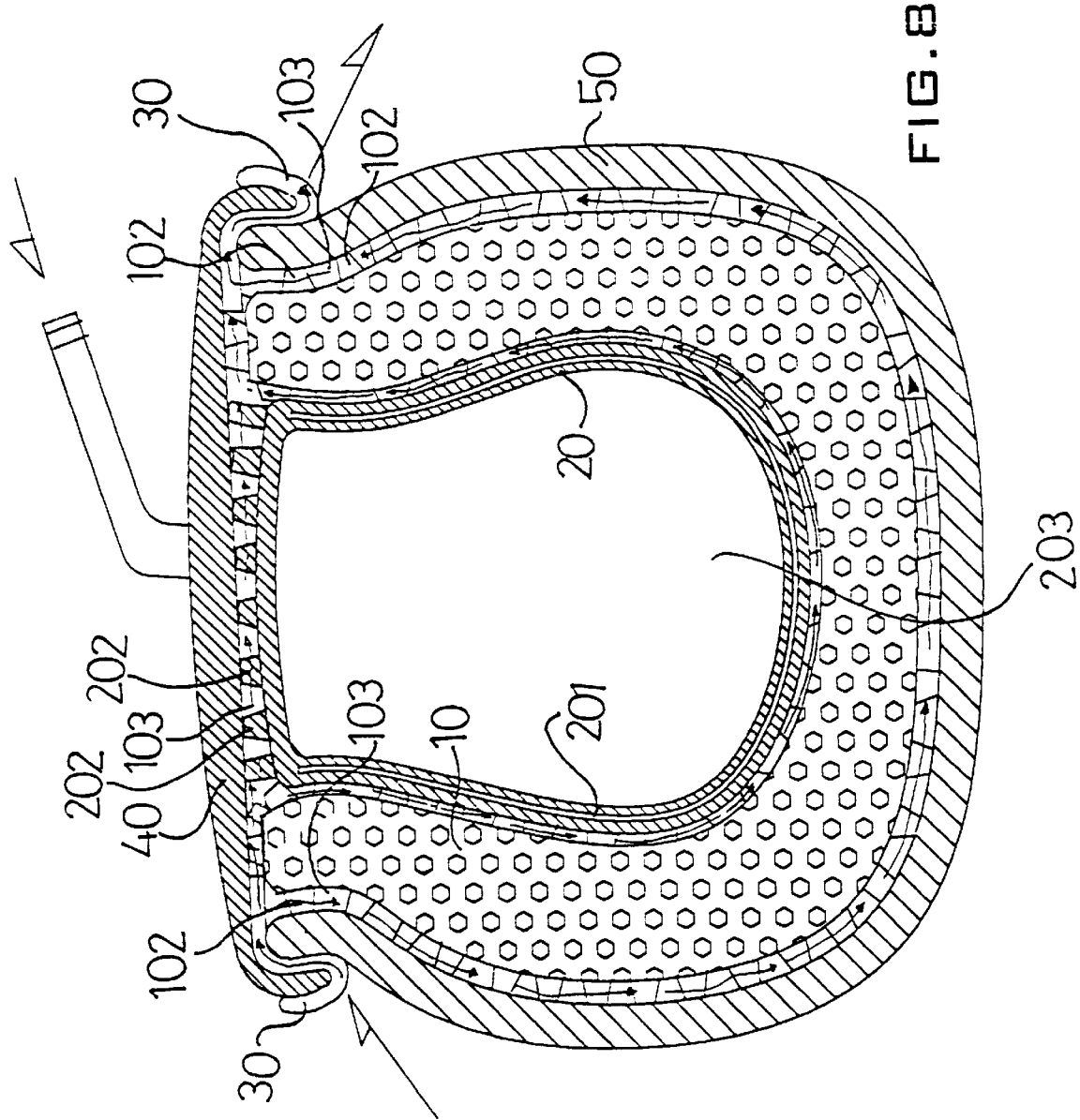
FIG. 8 illustrates the circulation of air through the flow guide grooves on the flow guide hooks and the air channels in the protective cushion and the inner tube according to the present invention.

The protective cushion 10 is inserted into the outer tire 50, then the inner tube 20 is inserted into the annular groove 101 inside the protective cushion 10 (see FIG. 6), and then the rim 40 is inserted into the outer tire 50, and then the floss guide hooks 30 are respectively installed to secure the outer tire 50 to the rim 40 (see FIG. 7). After installation, the air chamber 203 of the inner tube 20 is inflated. When the motorcar runs on the road, outside air circulates through the flow guide grooves 301 on the flow outside hooks 30 and the air channels 103, enabling heat to be carried out of the tire. Further, because the protective cushion 10 surrounds the inner tube 20, the protective cushion 10 protects the inner tube 20 against any external object, which is pierced through the outer tire 50.

What the invention claimed is:

1. A vehicle tire comprising an outer tire fastened to a rim, a plurality of hooks respectively mounted on said outer tire and hooked on said rim to secure said outer tire and said rim together, and an inner tube mounted within said outer tire and said rim, wherein a protective cushion is mounted within said outer tire around said inner tube to protect said inner tube against external objects, said protective cushion comprising an annular groove, which receives said inner tube, and a plurality of pegs raised from the periphery thereof and defining a plurality of air channels; said inner tube comprises a plurality of pegs raised from the periphery thereof at an inner side and defining a plurality of air channels; said hooks each comprise a plurality of longitudinally extended flow guide grooves for guiding outside air to circulate through the air channels in said protective cushion and said inner tube to carry heat away from the inside of the tire.

* * * * *